(12) United States Patent
Gavade et al.

(10) Patent No.: US 8,839,118 B2
(45) Date of Patent: Sep. 16, 2014

(54) USERS AS ACTORS IN CONTENT

(75) Inventors: Sameer Vasant Gavade, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 455 days.

(21) Appl. No.: 12/827,020

(22) Filed: Jun. 30, 2010

(65) Prior Publication Data

US 2012/0005595 A1    Jan. 5, 2012

(51) Int. Cl.
| G06F 3/00 | (2006.01) |
| H04N 21/4545 | (2011.01) |
| H04N 5/272 | (2006.01) |
| H04N 21/472 | (2011.01) |
| G11B 27/34 | (2006.01) |
| H04N 21/2668 | (2011.01) |

(52) U.S. Cl.
CPC ..... *H04N 21/2668* (2013.01); *H04N 21/45452* (2013.01); *H04N 5/272* (2013.01); *H04N 21/47205* (2013.01); *G11B 27/34* (2013.01)
USPC ........... 715/751; 707/756; 707/758; 382/181; 382/229; 348/592

(58) Field of Classification Search
CPC ... G06Q 10/10; G06Q 10/109; G06Q 10/107; G06F 3/0481; H04L 12/1822
USPC ........... 715/751; 345/473, 474, 475; 707/756, 707/758; 382/229, 181; 348/592
See application file for complete search history.

(56) References Cited

U.S. PATENT DOCUMENTS

| 7,477,264 | B2 * | 1/2009 | Grigorovitch et al. | 345/629 |
|---|---|---|---|---|
| 7,768,528 | B1 * | 8/2010 | Edwards et al. | 345/619 |
| 8,135,724 | B2 * | 3/2012 | Smyers | 707/756 |
| 2004/0218100 | A1 * | 11/2004 | Staker et al. | 348/592 |
| 2005/0123887 | A1 * | 6/2005 | Joung et al. | 434/307 A |
| 2007/0174775 | A1 * | 7/2007 | McAlpine et al. | 715/723 |
| 2007/0230794 | A1 * | 10/2007 | McAlpine et al. | 382/190 |
| 2008/0165195 | A1 * | 7/2008 | Rosenberg | 345/473 |
| 2008/0235582 | A1 * | 9/2008 | Zalewski et al. | 715/716 |
| 2010/0153847 | A1 * | 6/2010 | Fama | 715/719 |
| 2010/0220933 | A1 * | 9/2010 | Takano et al. | 382/224 |
| 2012/0051658 | A1 * | 3/2012 | Tong et al. | 382/224 |
| 2012/0154684 | A1 * | 6/2012 | Luo et al. | 348/700 |

* cited by examiner

*Primary Examiner* — Boris Pesin
*Assistant Examiner* — James G Pohlman (57) ABSTRACT

A method may include receiving a plurality of images of a face of a user, wherein each image of the face of the user is associated with one of a plurality of different expressions. The method may also include receiving a first video, wherein the first video comprises images of an actor including images of a face of the actor, wherein each image of the face of the actor is associated with one of the plurality of different expressions. Further, the method may include replacing the images of the face of the actor with corresponding images of the face of the user in a same expression to create a second video and transmitting the second video to the user.

17 Claims, 11 Drawing Sheets

USERS AS ACTORS IN CONTENT

BACKGROUND INFORMATION

Television viewers have access to an ever-growing amount and variety of content. For example, a viewer may choose between broadcast television programs, pay-per-view programs, on-demand programs, interactive games, music, etc. Typically, this content does not allow for the viewers or users to insert themselves into the content.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Figure 1:
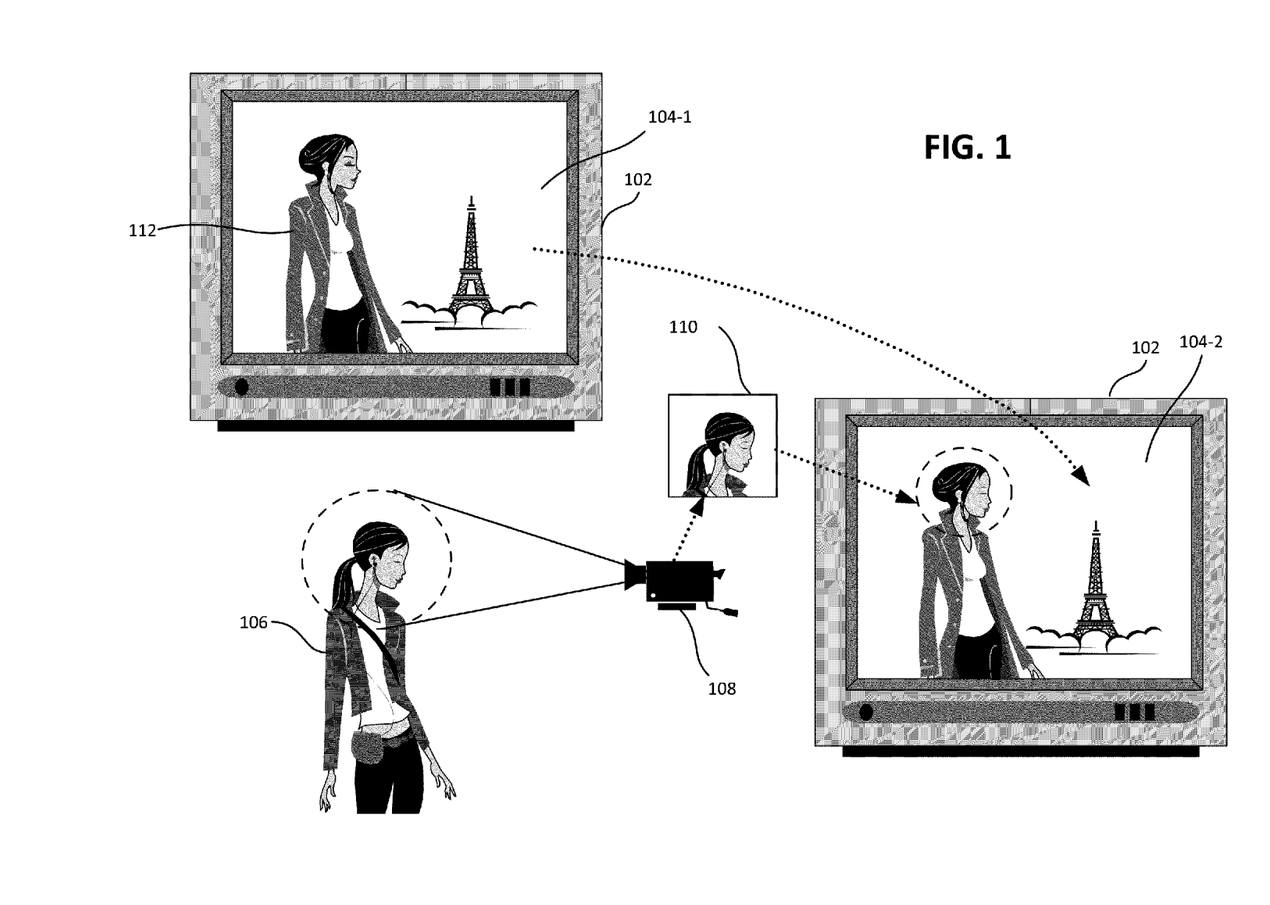
FIG. 1 is a diagram of an overview of an exemplary embodiment.

Embodiments described below may allow for users to substitute images of themselves (e.g., their faces and/or body) in movies, for example, in place of the original actors. FIG. 1 provides an example in which Mary, a user and aspiring actor, substitutes images of herself in place of the original actor in a movie. In this example, Mary 106 views an original movie 104-1 on a television (TV) 102. One scene of original movie 104-1 includes an actor 112 in front of background scenery that includes the Eiffel tower. Mary wishes to replace images of original actor 112 with images of herself. Using a camera 108, Mary captures images and/or video 110 of herself, for example, in different positions with different facial expressions. Mary 106 then uploads the captured images and/or video 110 to a mixing engine (not shown) that mixes the original movie 104-1 with the captured images and/or video 110 of Mary. In doing so, the mixing engine may replace the images of the face of actor 112 in movie 104-1 with images of Mary's 106 face. As a result, the mixing engine generates a new movie 104-2 (e.g., "mixed" content) that includes content from original movie 104-1 and captured images and/or video 110 of Mary 106. In this example, Mary 106 may be considered a "user-as-actor" (UAA) in new movie 104-2. Mary may share new movie 104-2 with others who may comment, review, or vote on new movie 104-2 and/or Mary's performance as an actor.

Figure 2:
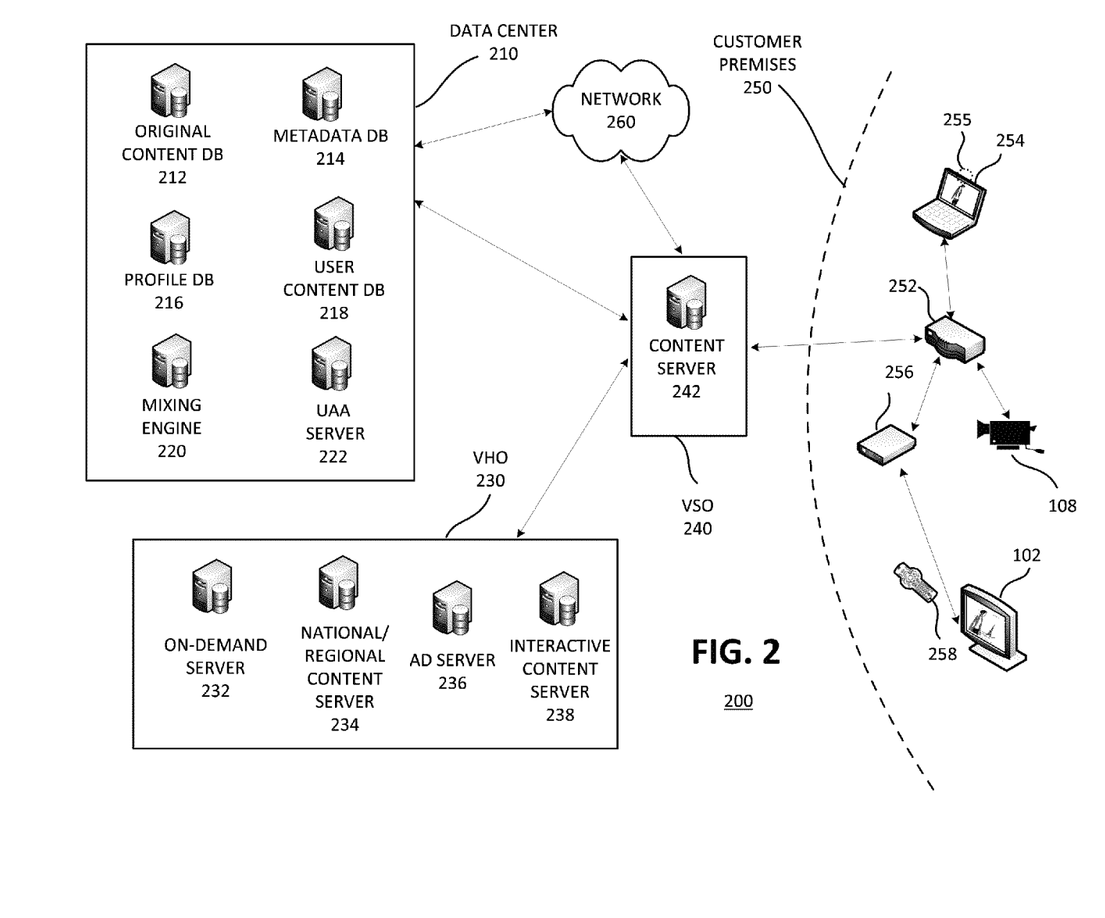
FIG. 2 is a diagram of an exemplary network for implementing different embodiments.

FIG. 2 is a diagram of an exemplary network 200 for implementing the embodiment of FIG. 1 and other embodiments. Network 200 may include a data center 210, a video hub office (VHO) 230, a video service office (VSO) 240, customer premises 250, and a network 260.

As with FIG. 1, customer premises 250 (e.g., the customer's home) includes TV 102 and camera 108. Customer premises 250 may also include an optical network terminal (ONT) 252, a set-top box (STB) 256, a computer 254, and a remote control 258. ONT 252 may receive data, e.g., on a fiber optic cable, and may transfer the data to the appropriate device in customer premises 250, such as computer 254 or STB 256. Likewise, ONT 252 may receive data from any device in customer premises 250 and may transmit the data to other devices in network 200, e.g., through a fiber optic cable.

STB 256 may receive content through content server 242, for example, and output the content to TV 102 for display. STB 256 may include a component (e.g., a cable card or a software package) that plugs into a host device (e.g., a personal computer, TV 102, a stereo system, etc.) that allows the host device to display content. STB 256 may also be implemented as a home theater personal computer (HTPC), an optical disk player (e.g., digital video disk (DVD) or Blu-Ray™ disc player), a cable card, etc. STB 256 may receive commands from other components in network 200 (e.g., remote control 258).

TV 102 may include speakers as well as a display. TV 102 may play content, for example, received through VSO 240 or from a camera (e.g., camera 108). While some embodiments described below may use TV 102, other embodiments may play content using any device (e.g., computer 254 or a mobile phone) capable of receiving and displaying content.

Remote control 258 may issue wired or wireless commands for controlling other electronic devices, such as TV 102 or STB 256. Remote control 258, in conjunction with STB 256, may allow a user to manually select and play content (e.g., mixed or original content) for viewing on TV 102. Remote control 258 may also be used in conjunction with STB 256 to record images and/or video for mixing engine 220 to mix with original content. Other types of devices (e.g., a keyboard, mouse, mobile phone, etc.) may be used instead of remote control 258.

Camera 108 may capture images and video of users to generate user content for mixing with original content. Camera 108 may also include a microphone for capturing audio as part of user content for mixing with original content. Camera 108 may include a three-dimensional (3D) camera, e.g., a camera with multiple lenses to capture images of a user. In one embodiment camera 108 may include (or alternatively be) a 3D scanner for forming a three-dimensional model of a user.

Computer 254 may include a laptop, a desktop, a mobile telephone, a personal digital assistant (PDA), or another portable communication device. Computer 254 may include a camera 255 for capturing images and video of users to generate user content for mixing with original content. Camera 255 may function similarly to camera 108 described above. Computer 254 may also include a microphone for capturing audio as part of user content for mixing with original content.

Customer premises 250 may connect to VSO 240. VSO 240 may collect and deliver content to customer premises 250 and may receive data from customer premises 250 (e.g., user content) for forwarding to the proper destination (e.g., data center 210). VSO 240 may include a content server 242. Content server 242 may include a content multiplexer to select content, such as mixed content, on-demand content, regional or national content, interactive content, and/or advertising content, and multiplex the information together.

Content server 242 may also perform transcoding, encoding, decoding, or encryption functions.

Data center 210 may include one or more servers that manage and/or store information associated with providing "user-as-actor" services (e.g., providing mixed content or UAA content). As shown in FIG. 2, data center 210 may include an original content database (DB) 212, a profile DB 216, a metadata DB 214, a user content DB 218, a mixing engine 220, and/or a UAA server 222.

Original content DB 212 may include a server to store content (e.g., video content) into which users may insert images and/or video of themselves (e.g., "original" content). In one embodiment, original content may include actors (e.g., "original" actors) that may be replaced with images and/or video of users. User content DB 218 may include content provided by users, such as video and/or images of the user with different facial expressions. For example, a user may upload an image of her right profile, left profile, front profile, a smiling expression, a sad expression, a surprised expression, etc. User content may also include audio of the user reading lines of a script. In one embodiment, user content may include a video of the user acting out a part, which may include audio and video. In one embodiment, user content DB 218 may also include content generated by mixing engine 220.

Metadata DB 214 may include a server that stores information about content. Metadata DB 214 may store information about original content, user content, or mixed content. For original content, such as a movie, metadata DB 214 may store the title, genre, plot, director, cast, etc., of the video. For original content, metadata DB 214 may also store the time periods an actor appears, a description of the facial expression used by the actor during that time, a transcript of the dialog of the actor, the area of images that represents the actor's face, etc. For user content, metadata DB 214 may store the information regarding the corresponding user facial expression, the area of images that represents the user's face, the time the user content was generated, etc. For mixed content, metadata DB 214 may store the title, genre, plot, and user-as-actor cast of the content. Metadata storing information about content may include extended-markup-language data in the ScreenplayXML format, for example.

Profile DB 216 may include a server that stores information about user preferences, preferences of a group of users, or other information. Profile DB 216 may associate user content stored in user content DB 218 with the corresponding user. Profile DB 216 may associate groups of people who may together replace the entire original cast of a movie, for example. Profile DB may also store a contact list of other users associated with a particular user.

UAA server 222 may allow a user to browse original content for selecting original content for applying the UAA services. UAA server 222 may also allow a user to view mixed content and, in one embodiment, allow social features. For example, a user viewing mixed content may vote or rank a user-as-actor in mixed content. As another example, a user viewing mixed content may recommend the mixed content to another user. In one embodiment, UAA server 222 may use the metadata describing original content to determine what type of images to request from a user who desires to replace an actor in the corresponding content. For example, the metadata may specify that the user provide a right profile image, a left profile image, a smiling expression, a frowning expression, etc., as user content to replace original content.

Mixing engine 220 may include a processor to mix original content and user content to generate mixed content. Mixing engine 220 may use the metadata describing original content and metadata describing user content while replacing images of an original actor with images of the user or otherwise inserting images of a user. For example, mixing engine 220 may use metadata describing the original content to determine parts of the original content (e.g., in time and space) for replacement. Mixing engine 220 may then use metadata describing the user content to determine the images, video, and/or sound to use when replacing the images, video, and/or sound in the original content.

VHO 230 may include an on-demand server 232, a national/regional content server 234, an advertisement (ad) server 236, and an interactive content server 238. Regional/national content server 234 may provide television broadcasts (e.g., local broadcasts, such as NBC, CBS, ABC, Fox, local cable access channels, etc.). Regional/national content server 234 may also include for-pay television broadcasts (e.g., TNT, ESPN, HBO, Cinemax, CNN, etc.). On-demand server 232 may provide on-demand content. Ad server 236 may provide and/or manage the advertising content (e.g., commercials) that is presented with other content. Interactive content server 238 may serve and manage interactive content (e.g., a form of content with which a user can interact).

Network 260 may include one or more packet switched networks, such as an Internet protocol (IP) based network, a local area network (LAN), a wide area network (WAN), a personal area network (PAN), an intranet, the Internet, or another type of network that is capable of transmitting data. Network 260 may include a circuit-switched network, such as a public-switched telephone network (PSTN) for providing telephone services for traditional telephones. Network 260, in conjunction with components in VSO 240, may allow devices at customer premises 250 (e.g., a computer or a set-top box) to connect to other devices also attached to network 260, such as third party web site servers (not shown) or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer homes. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
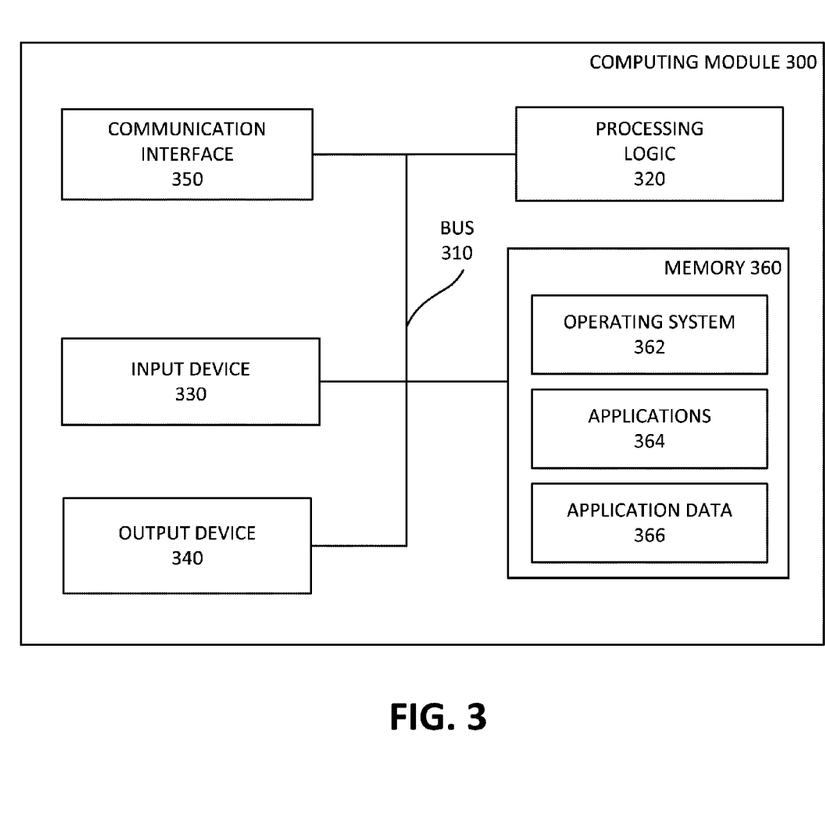
FIG. 3 is a block diagram of exemplary components of a computing module.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may allow a user to input information into computing module 300. Input device 330 may include a keyboard, a mouse, a pen, a microphone, a remote control (e.g., remote control 258), an image capture device (e.g., camera 108), a touch-screen display, etc. Some devices, such as servers 232-238, may be managed remotely and may not include input device 330. In other words, some devices may be "headless" and may not include a keyboard, for example.

Output device 340 may output information to the user. Output device 340 may include a display, a printer, a speaker, etc. For example, TV 102 includes a display (an output device), which may include a liquid-crystal display (LCD) for displaying content to the user. As another example, ONT 252 and STB 256 may include light-emitting diodes (LEDs). Headless devices, such as servers 232-238, may be managed remotely and may not include output device 340.

Input device 330 and output device 340 may allow the user to activate and interact with a particular service or application, such as user-as-actor application. Input device 330 and output device 340 may allow the user to receive and view a menu of options and select from the menu options. The menu may allow the user to select various functions or services associated with applications executed by computing module 300.

Communication interface 350 may include a transceiver that enables computing module 300 to communicate with other devices and/or systems. Communication interface 350 may include a transmitter that may convert baseband signals to radio frequency (RF) signals and/or a receiver that may convert RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, an RFD interface, a near-field communications (NFC) wireless interface, etc.

Memory 360 may store, among other things, information and instructions (e.g., applications 364 and operating system (OS) 362) and data (e.g., application data 366) for use by processing logic 320. Memory 360 may include a random access memory (RAM) or another type of dynamic storage device; a read-only memory (ROM) device or another type of static storage device; and/or some other type of magnetic or optical recording medium and its corresponding drive (e.g., a hard disk drive (HDD)).

OS 362 may include software instructions for managing hardware and software resources of computing module 300. For example, OS 362 may include Linux, Windows, OS X, an embedded operating system, etc. Applications 364 and application data 366 may provide network services or include applications, depending on the device in which the particular computing module 300 is found.

Computing module 300 may perform the operations described herein in response to processing logic 320 executing software instructions contained in a computer-readable medium, such as memory 360. A computer-readable medium include a physical or logical memory device. The software instructions may be read into memory 360 from another computer-readable medium or from another device via communication interface 350. The software instructions contained in memory 360 may cause processing logic 320 to perform processes that are described herein.

Figure 4A:
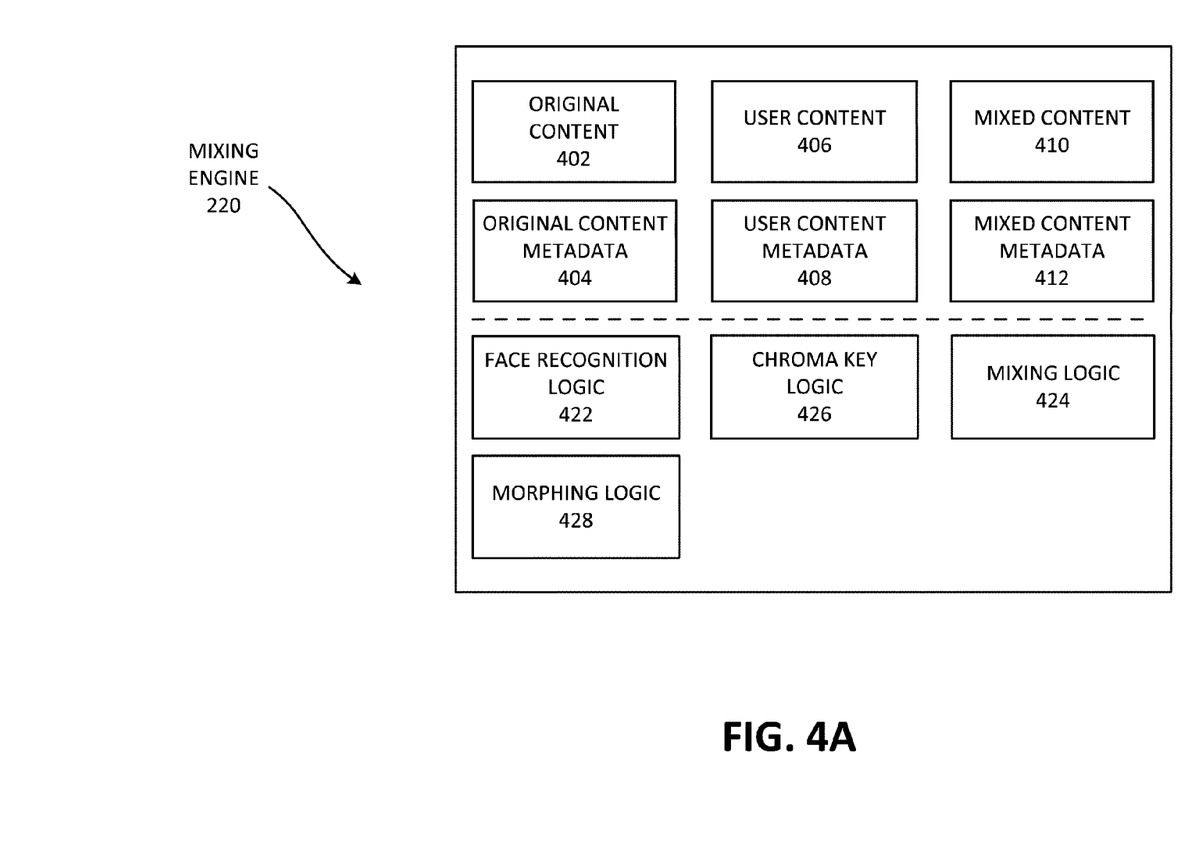
FIG. 4A is a block diagram of exemplary components of the mixing engine of the network shown in FIG. 2.

As described above, mixing engine 220 may mix original content and user content to generate mixed content. FIG. 4A is a block diagram of exemplary components of mixing engine 220 (e.g., functions performed by application 364 in processing logic 320 or stored in memory 360 of mixing engine 220). Mixing engine 220 may store original content 402, original content metadata 404, user content 406, user content metadata 408, mixed content 410, and mixed content metadata 412. Mixing engine 220 may also include face recognition logic 422, chroma key logic 426, mixing logic 424, and morphing logic 428.

Mixing engine 220 may receive and store original content 402 from original content DB 212 and user content 406 from user content DB 218. Further, mixing engine 220 may receive original content metadata 404 and user content metadata 408 from metadata DB 214. Using mixing logic 424, mixing engine 220 may insert user content 406 into original content 402 or replace the images of actors in original content 402 with user content 406. Face recognition logic 422 may determine the area of an image that represents an actor's face to be replaced. If the image that represents an actor's face was captured using a 3D camera or a 3D scanner, face recognition logic 422 may input 3D information for recognizing the actor's face. Face recognition logic 422 may also determine the area of an image that represents a user's face to be used for replacing the face of the original actor. If the image that represents the user's face was captured using a 3D camera or a 3D scanner, face recognition logic 422 may input the 3D information for recognizing the user's face. Face recognition logic may store the area associated with faces in metadata DB 214.

Mixing logic 424 may employ morphing logic 428 to change an image of a user's face from one expression to another or to give the appearance that a user-as-actor is talking. If an image of a user's face was captured using a 3D camera or a 3D scanner, morphing logic 424 may input the 3D information to morph an image from one expression to another or to give the appearance that the user-as-actor is talking. In one embodiment, morphing logic 428 may input a 3D scan of a user and output images of the user in different expressions, for example. Further, morphing logic 428 may be used to better integrate the facial expression of a user into original content 402.

Mixing engine 220 may also employ chroma-key logic 426 to remove the background from user content or original content. For example, a user could act out a part against a green background. In this example, chroma-key logic may easily remove the image of the user from the image of the background (all green) to so that the image of the user may be superimposed on original content.

Figure 4B:
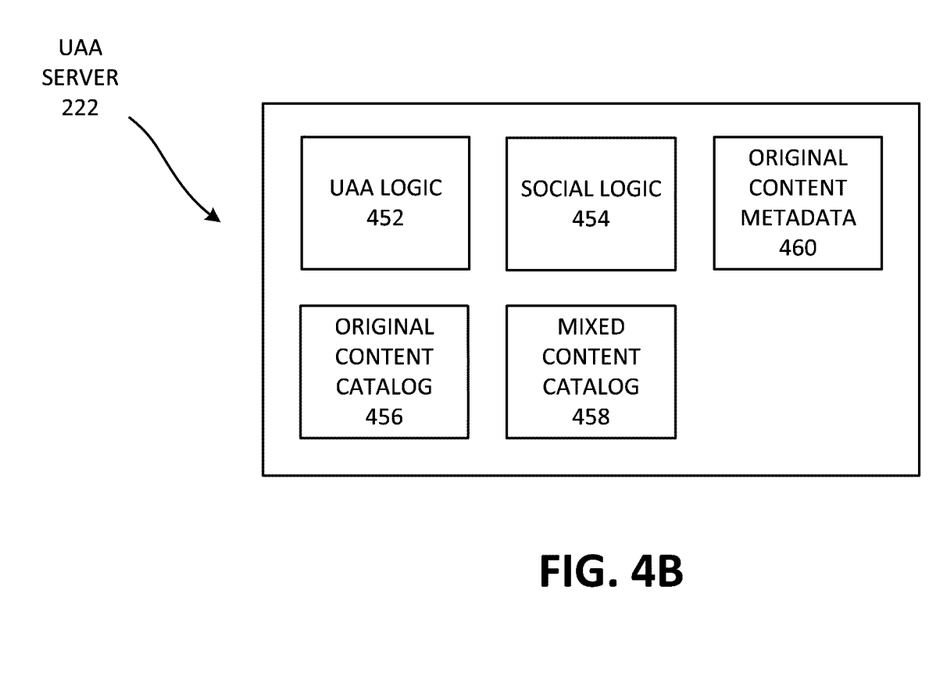
FIG. 4B is a block diagram of exemplary components of the UAA server of the network shown in FIG. 2.

As discussed above, UAA server 222 may allow a user to browse original content for selecting original content for applying the UAA services. FIG. 4B is a block diagram of exemplary components of UAA server 222 (e.g., functions performed by application 364 in processing logic 320 or stored in memory 360 of UAA server 222). UAA server 222 may include UAA logic 452, social logic 454, an original content catalog 456, a mixed content catalog 458, and original content metadata 460. Some components shown in FIG. 4B may also be stored in other devices in network 200.

Original content catalog 456 may include a listing of original content and may be generated from original content metadata stored in metadata DB 214, for example. UAA logic 452 may provide the listing of original content to, for example, STB 256 for display on TV 102. In response, a user may select original content for user-as-actor services. Once selected, UAA server 222 may retrieve original content metadata 460. Using original content metadata 460, UAA logic 452 may interact with the user to indicate to the user the type of images and/or video the user should submit to UAA server 222 for user-as-actor services. For example, UAA logic 452 may request a left profile image, a right profile image, a smiling expression, etc.

UAA logic 452 may store any received user content in user content DB 218 and may request the services of mixing engine 220 to mix user content with original content. UAA logic may coordinate many different users who are using user-as-actor services to replace more than one original actors.

Mixed content catalog 456 may include a listing of mixed content and may be generated from mixed content metadata stored in metadata DB 214, for example. UAA logic 452 may provide the listing of mixed content to, for example, STB 256 for display on TV 102. In response, a user may select mixed content to view on TV 102. Once selected, UAA server 222 may retrieve the mixed content for delivery to STB 256 for display on TV 102. Social logic 454 may allow a user to rank mixed content, to vote for a user-as-actor, to recommend mixed content to friends, etc.

Figure 5:
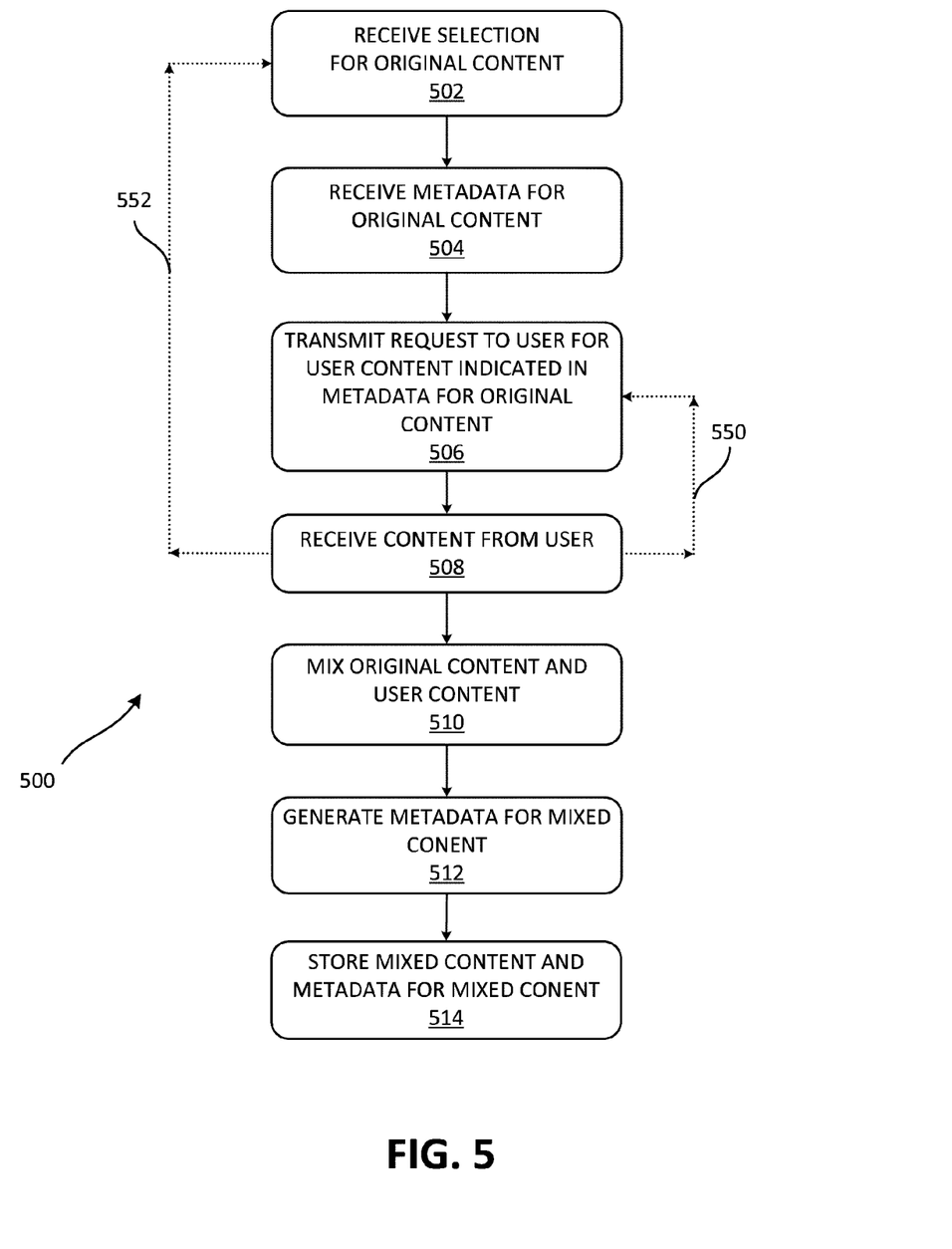
FIG. 5 is a flowchart of an exemplary process for mixing original and user content to generate mixed content.

As discussed above, data center 210 may provide user-as-actor services to users in, for example, customer premises 250. FIG. 5 is a flowchart of a process 500 for inserting user content into original content (e.g., substituting a user in the place of an actor in original video content). As with the example of FIG. 1, in this example, the user named Mary wishes to play the role of a character originally played by the original actor. The name of the character, in this example, is Isabel Lahiri, originally played by Catherine Zeta-Jones, in the movie titled "Ocean's Twelve."

Figure 6A:
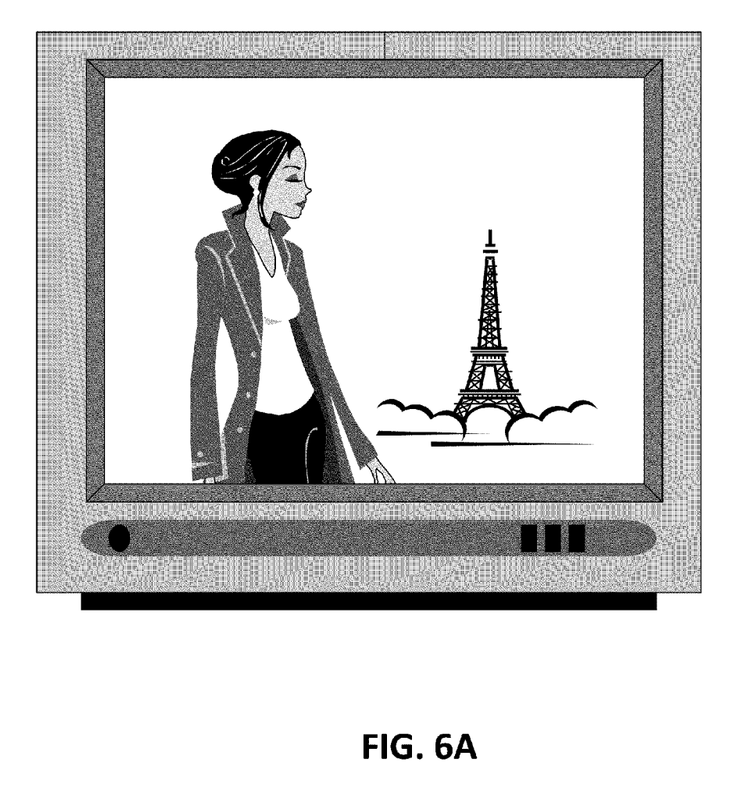
FIG. 6A is a diagram of exemplary original content.

In this example, process 500 may begin when UAA server 222 sends a list of original content to STB 256 for display on TV 102 for the user Mary to browse, Mary may use remote control 258 to interact with STI3 256 to play and select "Ocean's Twelve" from the list displayed on TV 102, FIG. 6A is a display of the selected original content including a scene with the character Isabel Lahiri and the Eiffel tower in the background. A selection for the original content (e.g., "Ocean's Twelve") may be received (block 502) by, for example, UAA server 222.

Figure 6B:
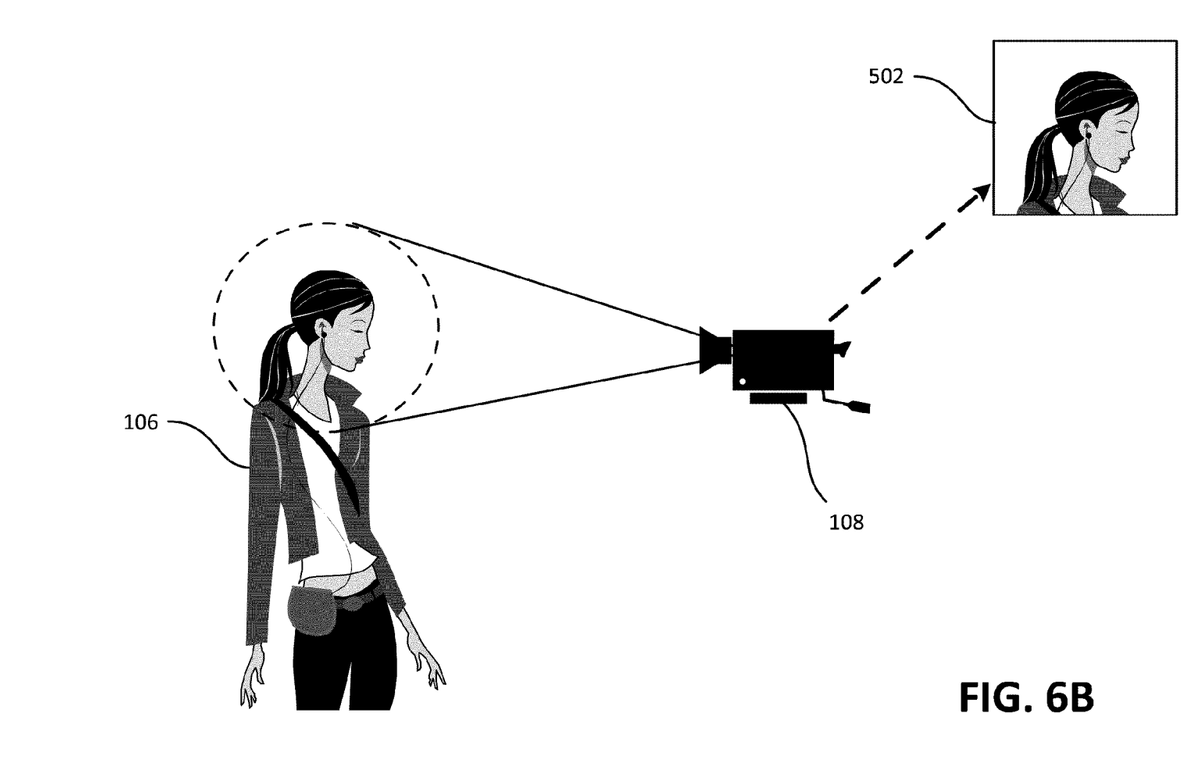
FIG. 6B is a diagram of exemplary user content.

The metadata associated with the selected original content may be received (block 504) by, for example, UAA server 222 from metadata DB 214. The metadata may indicate, for example, that Mary should provide an image of her right profile (e.g., the right side of her face). Requests for the user content (e.g., as indicated in the metadata for the selected original content) may be transmitted to the user (block 506). In response to the requests for content, the user may capture the requested content. For example, as shown in FIG. 6B, Mary may use camera 108 to capture image 502 at the request of UAA server 222. In another embodiment, the captured user image may be a video and may also include audio. In yet other embodiments, Mary may capture 3D images or 3D scans of herself as user content.

Mary may send the user content to UAA server 222, which receives the user content (block 508). UAA server 222 may store this content in user content DB 218. In one embodiment, blocks 506 and 508 may be repeated (loop 550) until the user content has provided all the content identified in the metadata and requested by UAA server 222. For example, metadata for Ocean's Twelve (the selected original content) may require ten different expressions from Mary. Each request may be transmitted to Mary (block 506) and received (block 508) until all ten expressions are received. In one embodiment, user content may be stored for reuse with a subsequent or different original content. Thus, a single user content including a "happy" expression may be mixed with more than one original content. In one embodiment, the user-as-actor Mary may provide a 3D scan of herself (e.g., her head and/or body) to UAA server 222. In this embodiment, morphing logic 428 may generate the requested user content identified in the metadata and requested by UAA server 222.

In one embodiment, multiple users may wish to play the roles of multiple characters in the original content. For example, Mary's brother may wish to play the role of the character Danny Ocean (originally played by George Clooney). In this case, blocks 502, 504, 506, and 508 may be repeated (loop 552) until all the users-as-actor content has been identified and received.

Figure 6C:
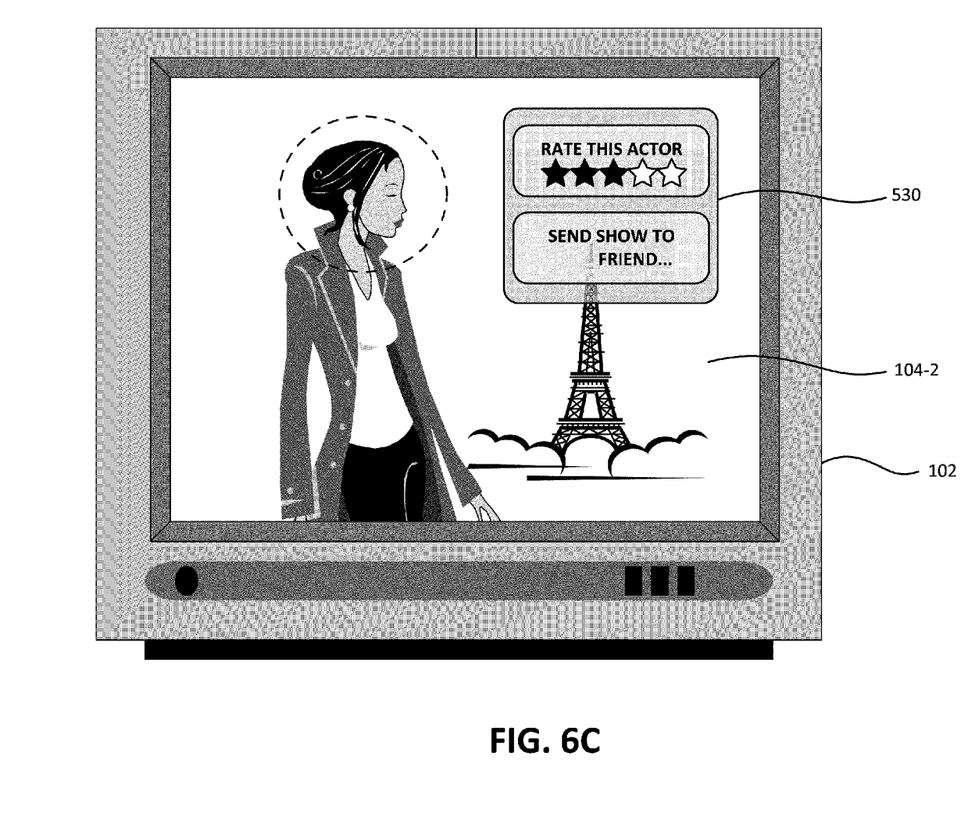
FIG. 6C is a diagram of exemplary mixed content.

Mixing engine 220, employing mixing logic 424, may mix the original content with the user content (block 510). For example, mixing engine 220 may retrieve the image of Mary's face from the user content DB 218. Employing face recognition logic 422, mixing engine 220 may identify the area of the user content corresponding to Mary's face and may also identify the area of the original content corresponding to the face of Catherine Zeta-Jones (playing Isabel Lahiri). In one embodiment, face recognition logic 422 may input 3D images or 3D scans of Mary and/or the original actor for recognizing faces. In yet another embodiment, the area corresponding to the original actor's face may have been previously determined and stored in the metadata associated with the original content. Mixing logic 424 may then replace the face of Catherine Zeta-Jones with that of Mary's. In this example, the resulting mixed content image is shown in FIG. 6C, which includes features of original content and user content. Mixing engine 220 may continue through the entire original content replacing images of Catherine Zeta-Jones with the appropriate images of Mary. In one embodiment, morphing logic 428 may change the original content or user content so as to minimize artifacts from combining different content. In one embodiment, morphing logic 428 may also create the illusion that Mary's image is engaging in speech, even though Mary may have provided only still images.

Mixing engine 220 may also generate metadata for the mixed content (block 512). The metadata for mixed content may include the title, genre, plot, and user-as-actor cast of the content. The metadata for the mixed content may also include a cumulative rating score for each actor in the mixed content. The metadata for the mixed content may also include the user-actor's name and a link to the user-actor's profile, for example.

Figure 7:
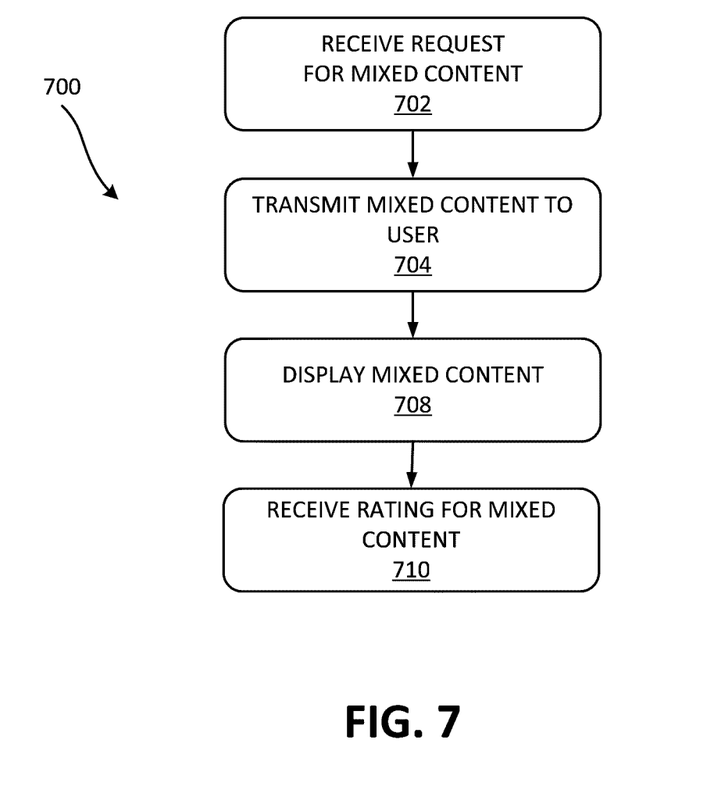
FIG. 7 is a flowchart of an exemplary process for viewing mixed content in a social computing environment.

The mixed content and the associated metadata may be stored (block 514) in, for example, user content DB 218 and metadata DB 214, respectively. Once stored, another user may request to view the mixed content from a mixed content catalog, as discussed above. FIG. 7 is a flowchart of a process 700 for viewing mixed content in a social computing environment. Process 700 may begin when UAA server 222 sends a list of mixed content to STB 256 for display on TV 102 for the user Mary to browse. Mary may use remote control 258 to interact with STB 256 to play and select "Ocean's Twelve starring Mary" from the list of mixed content displayed on TV 102.

The user may select "Ocean's Twelve starring Mary," using remote control 258, for example. UAA server 222 receives the request for mixed content (block 702) and the mixed content may be transmitted to the user (block 704) and displayed (block 706). For example, as shown in FIG. 6C, the mixed content 104-2 is displayed on TV 102. UAA server 222 may also present an interactive widget 530 to the user. This widget may allow the user to rate the actor in the mixed content. The rating, in this example, may be transmitted to UAA server 222, which may store the ratings from multiple users with the metadata associated with the mixed content. Widget 530 may also allow the user to share the mixed content with a friend from a contact list. The contact list may be stored in and associated with the user profile in profile DB 216.

In one embodiment, rather than replacing just the face of an actor with the face of a user-as-actor, mixing engine 220 may replace the entire body of an actor with the entire body of a user-as actor. In this embodiment, camera 108 may capture various body parts (e.g., a hand, an arm, a leg, etc., at different angles) of the user to be used to replace corresponding parts of the original actor. In one embodiment, body parts other than the face maybe replaced by the user-as-actor. For example, arms, hands, legs, or feet of the original actor may be replaced with the user-as-actor's arms, hands, legs, or feet.

Figure 8:
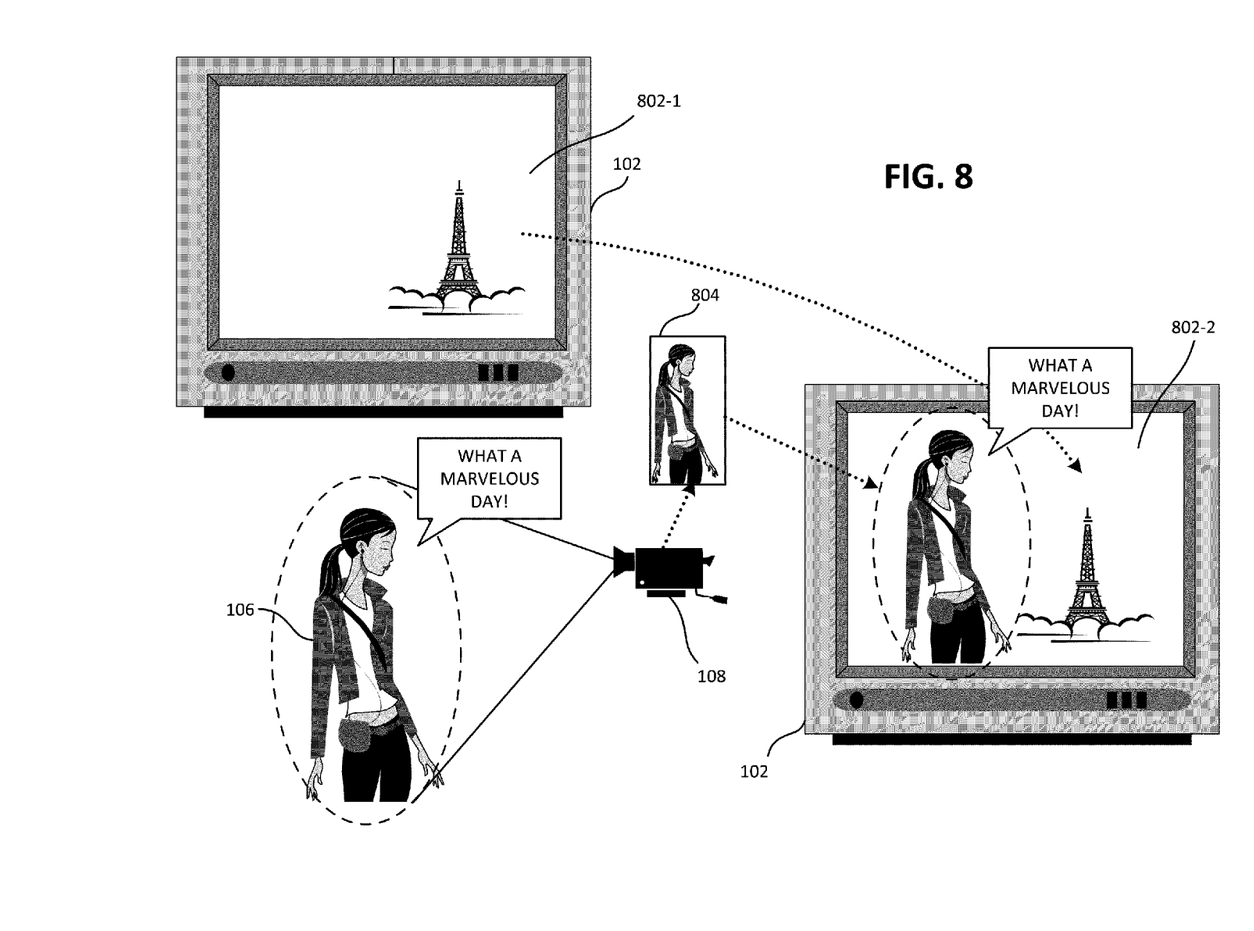
FIG. 8 is a diagram of an exemplary embodiment.

In another embodiment, the original content may be devoid of actors. That is, the "track" of the movie (e.g., a "screenplay" or "stage play") that includes the original actors may be removed so that the scenery remains in the original content without one or more actors. For example, FIG. 8 is a diagram of original content devoid of actors. As shown, movie 902-1 includes scenery displayed on TV 102, but the actors are not present (e.g., as compared to movie 102-1 in FIG. 1). In this embodiment, the users-as-actors (e.g., Mary 106) may act out a part for capture by camera 108 (e.g., an "act" of a "scene" of a "screenplay" or a "stage play"). In one embodiment, Mary may act out the part in front of a "green screen." Mary, the user, may then upload the captured video to UAA server 222. Mixing engine 220 may then mix the user content with the original content. Because Mary captured the user video with a green screen, mixing engine 220 may employ chroma-key logic 426 to remove (e.g., filter) the background from the user content for mixing with the original content. As shown in FIG. 8, mixing engine 220 has mixed original content 902-1 with Mary's user content 904 to generate mixed content 902-2, also displayed on TV 102. In this embodiment, Mary may either lip-sync the audio or record new audio as user content. Further, UAA server 222 may present the dialog for the user-as-actor to read from the metadata corresponding to the original content. In this case, the metadata may include information stored in ScreenplayXML format. In this embodiment, different users may each act out different roles for uploading and mixing with original content to generate mixed content.

In another embodiment, original content DB 212 may include pre-recorded, "stock" scenery from around the world (e.g., Paris, London, Austin, etc.) and in different situations (e.g., an office, a street, a shop, etc. Mary and her friends, all aspiring actors in a screenplay class, may select different scenes and each act out a part in front of camera 108. UAA server 222 and mixing engine 220 may piece together the original content (e.g., the stock video) and user content to generate unique mixed content with differing story lines.

In one embodiment, users may replace the scenery of the original content with user-provided scenery. For example, rather than a scene taking place in Paris, the actors may be superimposed in the user's own home town.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As used herein, the term "content" refers to any type of content, such as TV programs, movies, interactive games, audio content, radio content, etc. While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
presenting a list of videos to a user;
receiving, from the user, a selection of a first video from the list of videos;
obtaining, based on the selection, first metadata indicative of actor images appearing in the first video;
determining, based on the first metadata, a number of different user images to be requested from the user;
sending a series of requests to the user indicative of the number of user images until the number of user images is obtained by:
 receiving one or more of the requested user images, from the user, responsive to the series of requests,
 re-using at least one image from other video content generated from previously-obtained images, of the user, corresponding to one or more of the requested user images, and
 morphing at least one image, of the user, to generate one or more of the requested user images,
 wherein each requested user image is associated with one of a plurality of different facial expressions;
identifying, based on the first metadata, each of the actor images that corresponds to one of the plurality of different facial expressions;
replacing, based on the identifying, different ones of the actor images with one of the requested user images associated with a corresponding facial expression to create a second video;
generating second metadata associated with the second video, wherein the first metadata and the second metadata differ;
storing the second video and the second metadata on a computer-readable medium;
generating, based on the second metadata, a video content listing including the second video; and
providing the video content listing to a user device for user selection of the second video for display.

2. The computer-implemented method of claim 1, further comprising:

receiving a plurality of videos including images of the user, wherein each of the plurality of videos include one of the requested user images.

3. The computer-implemented method of claim 1, wherein morphing at least one image includes morphing a three-dimensional scan of the user from one facial expression to another facial expression of the different facial expressions.

4. The computer-implemented method of claim 1, further comprising:
   transmitting the second video to a second user;
   receiving, from a second user, a value indicative of a rating of the second video including images of the face of the second user; and
   recording, in the second metadata, the value indicative of the rating of the second video.

5. The computer-implemented method of claim 1,
   wherein the user includes a first user and the actor includes a first actor,
   wherein the first video comprises images of a second actor including images of a face of the second actor, wherein each image of the face of the second actor is associated with one of the plurality of different expressions, the computer-implemented method further comprising:
   receiving a plurality of images of a face of a second user, wherein each image of the face of the second user is associated with one of the plurality of different expressions; and
   replacing the images of the face of the second actor with images of the face of the second user associated with a corresponding expression to create the second video.

6. The computer-implemented method of claim 1, wherein the first metadata associates times in the first video during which the face of the actor appears.

7. The computer-implemented method of claim 6, wherein the first metadata defines an area of the actor images that include the image of the face of the actor.

8. The computer-implemented method of claim 6, wherein the first metadata associates each image of the face of the actor with one of the plurality of different facial expressions.

9. A system comprising:
   a network device including:
      a receiver to receive, responsive to a series of requests for a plurality of images of a user based on a first video selected by the user, user images obtained by:
         receiving one or more of the user images, from the user, responsive to the series of requests,
         re-using at least one image from other video content generated from previously-obtained images, of the user, corresponding to one or more of the user images, and
         morphing at least one image, of the user, to generate one or more of the user images,
         wherein each user image is associated with first metadata indicative of one of a plurality of different facial expressions,
         wherein the first video comprises actor images, and
         wherein different ones of the actor images are associated with second metadata indicative of one of the plurality of different facial expressions;
      a processor configured to:
         determine, based on the first metadata and the second metadata, different ones of the user images associated with the different ones of the actor images in a corresponding facial expression,
         replace, based on the determination, the different ones of the actor images with the different ones of the user images, associated with the corresponding facial expression, to create a second video,
         reuse one or more of the different ones of the user images for replacing other actor images of another actor appearing in a different video subsequently selected from the list of video content, to generate a third video, and
         generate, using the first metadata and the second metadata, third metadata associated with the second video and fourth metadata associated with the third video; and
      a computer-readable medium to store the third metadata, fourth metadata, the second video, and the third video.

10. The system of claim 9, further comprising:
    a user device including:
       a camera, wherein the camera captures a plurality of videos of the user, wherein each of the plurality of videos includes one of the plurality of images of the user; and
       a transmitter to transmit the plurality of videos of the user to the network device.

11. The system of claim 9, wherein the processor is further configured to morph the different ones of the images of the user from one of the plurality of different facial expressions to another one of the plurality of different facial expressions.

12. The system of claim 9, wherein the network device further comprises:
    a user device including:
       a receiver to receive the second video;
       a display to show the second video to a second user;
       an input device to receive, from the second user, a value indicative of a rating of the second video including the images of the face of the second user, and
       a transmitter to send the value indicative of the rating of the second video to the network device to store in the computer-readable medium,
    wherein the processor is further configured to modify the third metadata based on the sent value.

13. The system of claim 9,
    wherein the user includes a first user and the actor includes a first actor,
    wherein the first video comprises images of a second actor including images of a face of the second actor, wherein each image of the face of the second actor is associated with one of the plurality of different facial expressions,
    wherein the receiver of the network device is further configured to receive a plurality of images of a face of a second user, each image of the face of the second user being associated with one of the plurality of different facial expressions;
    wherein the processor is further configured to replace the images of the face of the second actor with images of the face of the second user in a corresponding facial expression to create the second video.

14. The system of claim 9, wherein the second metadata associates times in the first video during which the face of the actor appears.

15. The system of claim 14, wherein the second metadata defines an area of the actor images that include the image of the face of the actor.

16. The system of claim 14, wherein the second metadata associates each image of the face of the actor with one of the plurality of different facial expressions or wherein the first metadata defines the plurality of different facial expressions.

17. The system of claim 11, further comprising:
    a three-dimensional camera or a three-dimensional scanner, wherein, based on information captured by the three-dimensional camera or the three-dimensional scanner, the processor is further configured to morph the different ones of the user images from one of the plurality of different facial expressions to another one of the plurality of different facial expressions.

* * * * *